(12) United States Patent
Cohen et al.

(10) Patent No.: US 7,752,958 B2
(45) Date of Patent: *Jul. 13, 2010

(54) COOKING APPLIANCE

(75) Inventors: Eli Cohen, Lev HaSharon (IL); Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 475 days.

This patent is subject to a terminal disclaimer.

(21) Appl. No.: 11/580,119

(22) Filed: Oct. 13, 2006

(65) Prior Publication Data

US 2007/0186785 A1    Aug. 16, 2007

Related U.S. Application Data

(63) Continuation-in-part of application No. 29/253,822, filed on Feb. 14, 2006, now Pat. No. Des. 543,410.

(51) Int. Cl.
*A47J 37/00*    (2006.01)

(52) U.S. Cl. .............................. 99/375; 99/349; 99/372

(58) Field of Classification Search ........... 99/326–333, 99/349–351, 339, 400, 401, 372–380, 444–450; 126/41 R, 20; 219/521–524, 450.1, 451.1, 219/468.1, 468.2, 544

See application file for complete search history.

(56) References Cited

U.S. PATENT DOCUMENTS

| D155,422 | S | | 4/1949 | Henderson |
| 2,719,903 | A | | 10/1955 | Oertli |
| 3,352,227 | A | | 11/1967 | Litman |
| 3,524,404 | A | | 8/1970 | Kimura et al. |
| 4,002,112 | A | * | 1/1977 | Snyder .................. 99/376 |
| 4,011,431 | A | * | 3/1977 | Levin .................. 219/524 |
| 4,091,720 | A | * | 5/1978 | Wheeler ................ 99/375 |
| 4,150,609 | A | * | 4/1979 | McClean ............... 99/372 |
| D253,218 | S | | 10/1979 | Johnson |
| 4,206,345 | A | * | 6/1980 | Maass et al. ........... 219/524 |
| 4,601,237 | A | | 7/1986 | Harter et al. |
| 4,627,335 | A | | 12/1986 | Sherman et al. |
| 4,664,025 | A | | 5/1987 | Martinez |

(Continued)

FOREIGN PATENT DOCUMENTS

EP    1020153    7/2000

(Continued)

OTHER PUBLICATIONS

Official Action Dated Feb. 9, 2009 From the US Patent and Trademark Office Re.: U.S. Appl. No. 11/329,064.

(Continued)

*Primary Examiner*—Timothy F. Simone

(57) ABSTRACT

A cooking appliance including a pair of cooking plates pivotally mounted to each other by a slideable hinge at one end. Stops at their opposite ends are pre-settable to a first position permitting two-surface contact with the food article, or a second position supporting one cooking plate in spaced parallel relationship with respect to the other cooking plate to permit single-surface contact with the food article. At least one of the said cooking plates carries on its outer surface a removable tray communicating with the interior of the cooking appliance for receiving drippings accumulating within the cooking appliance during a cooking operation.

20 Claims, 6 Drawing Sheets

U.S. PATENT DOCUMENTS

| | | | |
|---|---|---|---|
| D299,609 S | 1/1989 | Madl | |
| 4,852,545 A | 8/1989 | Sherman et al. | |
| D309,844 S | 8/1990 | Storsberg | |
| 5,129,313 A * | 7/1992 | Coppier | 99/376 |
| 5,181,455 A | 1/1993 | Masel et al. | |
| D334,108 S | 3/1993 | Fisher | |
| D347,548 S | 6/1994 | Boehm et al. | |
| D364,992 S | 12/1995 | Wooderson et al. | |
| 5,606,905 A | 3/1997 | Boehm et al. | |
| 5,636,564 A | 6/1997 | Weiss | |
| 5,755,150 A | 5/1998 | Matsumoto et al. | |
| 5,768,994 A | 6/1998 | Bobo | |
| 5,791,234 A | 8/1998 | Newton et al. | |
| D411,937 S | 7/1999 | Siegler et al. | |
| 5,937,742 A | 8/1999 | Steeb et al. | |
| 5,970,851 A | 10/1999 | Masel et al. | |
| 6,003,436 A | 12/1999 | Masel et al. | |
| 6,012,380 A | 1/2000 | Hermansson | |
| 6,016,741 A | 1/2000 | Tsai et al. | |
| D419,823 S | 2/2000 | Choi | |
| 6,109,169 A | 8/2000 | Masel et al. | |
| 6,167,796 B1 | 1/2001 | Wright et al. | |
| 6,192,788 B1 | 2/2001 | Benedictus et al. | |
| 6,257,126 B1 | 7/2001 | Velijkovic et al. | |
| 6,321,639 B1 | 11/2001 | Misceo | |
| D456,666 S | 5/2002 | Monguilod | |
| 6,397,730 B1 | 6/2002 | Steinbach et al. | |
| 6,439,108 B1 | 8/2002 | Wu | |
| D467,766 S | 12/2002 | Wanat et al. | |
| 6,555,795 B2 * | 4/2003 | Glucksman et al. | 219/450.1 |
| 6,595,116 B1 | 7/2003 | Lin | |
| 6,782,804 B1 | 8/2004 | Lin | |
| 6,889,602 B2 * | 5/2005 | Brady et al. | 99/378 |
| 7,021,199 B2 | 4/2006 | Lubowicki et al. | |
| D519,776 S | 5/2006 | Chen | |
| 7,109,442 B2 | 9/2006 | Steinberg et al. | |
| 2004/0216730 A1 | 11/2004 | Sawhney et al. | |
| 2006/0266346 A1 | 11/2006 | Grant | |
| 2007/0157823 A1 | 7/2007 | Cohen et al. | |

FOREIGN PATENT DOCUMENTS

| | | |
|---|---|---|
| FR | 2623705 | 6/1989 |
| GB | D2024495 | 7/1992 |
| JP | 2008-093410 | 4/2008 |
| WO | WO2006/126064 | 11/2006 |

OTHER PUBLICATIONS

Official Action Dated Aug. 14, 2008 From the US Patent and Trademark Office Re.: U.S. Appl. No. 11/135,331.

Official Action Dated Aug. 15, 2008 From the US Patent and Trademark Office Re.: U.S. Appl. No. 11/329,064.

Notice of Allowance Dated Dec. 13, 2006 From the US Patent and Trademark Office Re.: U.S. Appl. No. 29/253,822.

Official Action Dated Mar. 9, 2009 From the US Patent and Trademark Office Re.: U.S. Appl. No. 11/135,331.

Official Action Dated Jun. 12, 2009 From the US Patent and Trademark Office Re.: U.S. Appl. No. 11/329,064.

Notice of Allowance Dated Oct. 14, 2009 From the US Patent and Trademark Office Re.: U.S. Appl. No. 11/135,331.

* cited by examiner

COOKING APPLIANCE

RELATED APPLICATION

This application is a continuation-in-part of U.S. Design patent application Ser. No. 29/253,822, filed Feb. 14, 2006, the contents of which are incorporated herein.

FIELD AND BACKGROUND OF THE INVENTION

The present inventions relates to cooking appliances, and particularly to cooking appliances which include pivotal cooking plates for cooking varied types of food articles, e.g., for grilling steaks, making waffles, warming buns, preparing pizzas, etc.

Cooking appliances of the foregoing type generally include a pair of cooking plates pivotally mounted to each other from an open position for permitting the introduction and removal of the food articles to be cooked, to a closed position for cooking the food articles. In such cooking appliances, the pair of cooking plates are generally pivotally mounted to each other by a slideable hinge to permit the cooking plates to accommodate the food article between them during the cooking operation. Such cooking appliances are commonly used for grilling stakes, hamburgers, and the like, involving direct contact of the food articles by both cooking plates. Examples of cooking appliances of this type are described in U.S. Pat. Nos. 5,606,905, 6,016,741 and 6,192,788.

The cooking appliance described in the latter patent, U.S. Pat. No. 6,192,788, also provides an arrangement for supporting one cooking plate in a parallel spaced relationship with respect to the other, i.e. to provide only one-surface contact with the food article to be cooked. The cooking appliance is thus converted to a sort of oven, in which one surface of the food article being cooked is in contact with a hot surface, whereas the other surface is spaced from the other hot surface. Such a cooking appliance is therefore useful for preparing pizzas or other gratinated dishes formed with a crust on its outer surface. When using the cooking appliance for the latter purposes, it is important to firmly support one cooking plate in parallel spaced relationship with respect to the other. The above-US patent does this by providing a projection and a seat on the two cooking plates at the pivotal ends thereof having the slideable hinge. However, such an arrangement provides a cantilever support for the two cooking plates, and therefore is not only unreliable for maintaining the two plates in a space parallel relationship, but is also subject to tremendous strains which can deform them particularly over a period of time.

Another problem in the use of such cooking appliances particularly for grilling purposes is the disposing of drippings from the food article during a grilling operation.

OBJECTS AND BRIEF SUMMERY OF THE PRESENT INVENTION

One object of the present invention is to provide a cooking appliance of the foregoing type provided with an improved arrangement for firmly supporting the two cooking plates in spaced parallel relationship when the appliance is to be used as an oven, e.g., for cooking pizzas or the like. Another object of the present invention is to provide a cooking appliance of the foregoing type which includes an efficient arrangement for catching and disposing drippings during a cooking operation particularly when the appliance is used for grilling steaks, hamburgers or the like.

According to one aspect of the present invention, that provided a cooking appliance comprising a pair of cooking plates pivotally mounted from an open position for permitting introduction and removal of food articles, to a closed position defining an interior for receiving and cooking the food articles; the pair of cooking plates being pivotally mounted about a pair of spaced, parallel pivotal axes by a slideable hinge at one end of the cooking plates permitting their pivotal axes to be slid towards or away from each other; the pair of cooking plates including pre-settable stops at their opposite ends pre-settable to a first position permitting two-surface contact with the opposite sides of a food article, or a second position supporting one cooking plate in spaced parallel relationship with respect to the other cooking plate and the food article to permit single-surface contact with only one side of the food article.

According to the preferred embodiment of the invention described below, the pre-settable stops are located on the outer edge of one of the cooking plates in the end thereof opposite to that of the slideable hinge, the pre-settable stops being pre-settable to engage or disengage fixed surfaces on the other of the cooking plates on the end thereof opposite to that of the slideable hinge. More particularly, in the described preferred embodiment, the fixed surfaces on the other cooking plate are fixed on the outer edges thereof, and the pre-settable stops on the one cooking plate are movable to a first position non-aligned with the fixed stops, or to a second position aligned with the fixed stops.

It will thus be seen that in such a cooking appliance, the two cooking plates are supported in spaced-parallel relationship from both ends of the cooking plates, which produces a much firmer, reliable and longer-lasting supporting arrangement than the cantilever arrangement described in the above-cited patent.

According to a further feature in the described preferred embodiment, at least one of the cooking plates, and preferably both, carry on their outer surfaces a removable tray communicating with the interior of the cooking appliance for receiving drippings accumulated within the cooking appliance during a cooking appliance. In the described preferred embodiment, at least one, and preferably both, cooking plates carry on their outer surfaces a holder open at one side to permit the slideable introduction and removal of the tray. Such an arrangement thus permits efficient catching and convenient removal of the drippings produced during a cooking operation, particularly when the cooking appliance is used for grilling steaks, hamburgers or the like.

Further features and advantages of the preferred embodiment of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiment described is for purposes of example only, and that the invention is capable of being embodied in other forms and applications than described herein.

DESCRIPTION OF A PREFERRED EMBODIMENT

Figure 1:
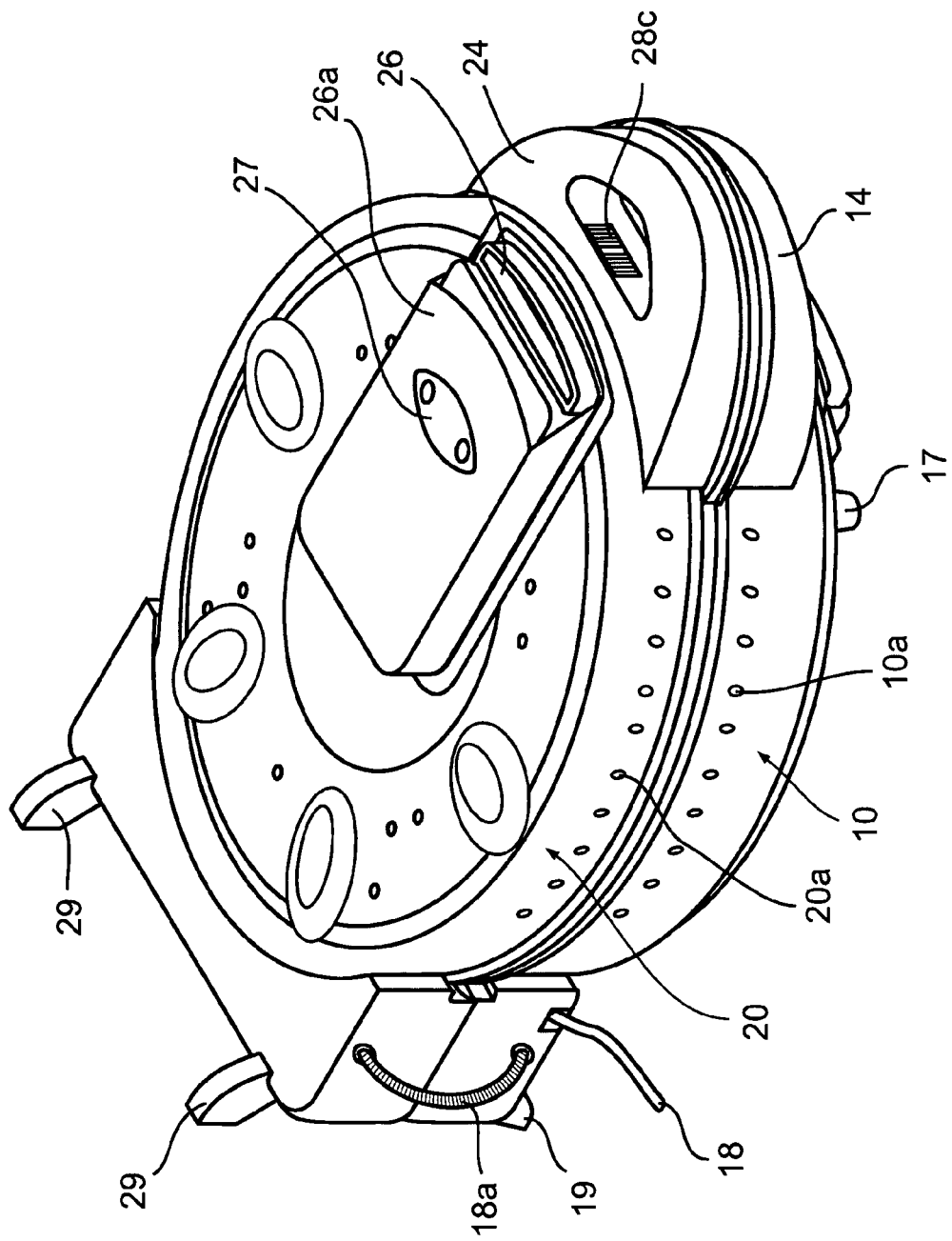
FIG. 1 is a top perspective view of one form of appliance, in its closed condition, constructed in accordance with the present invention.
Figure 2:
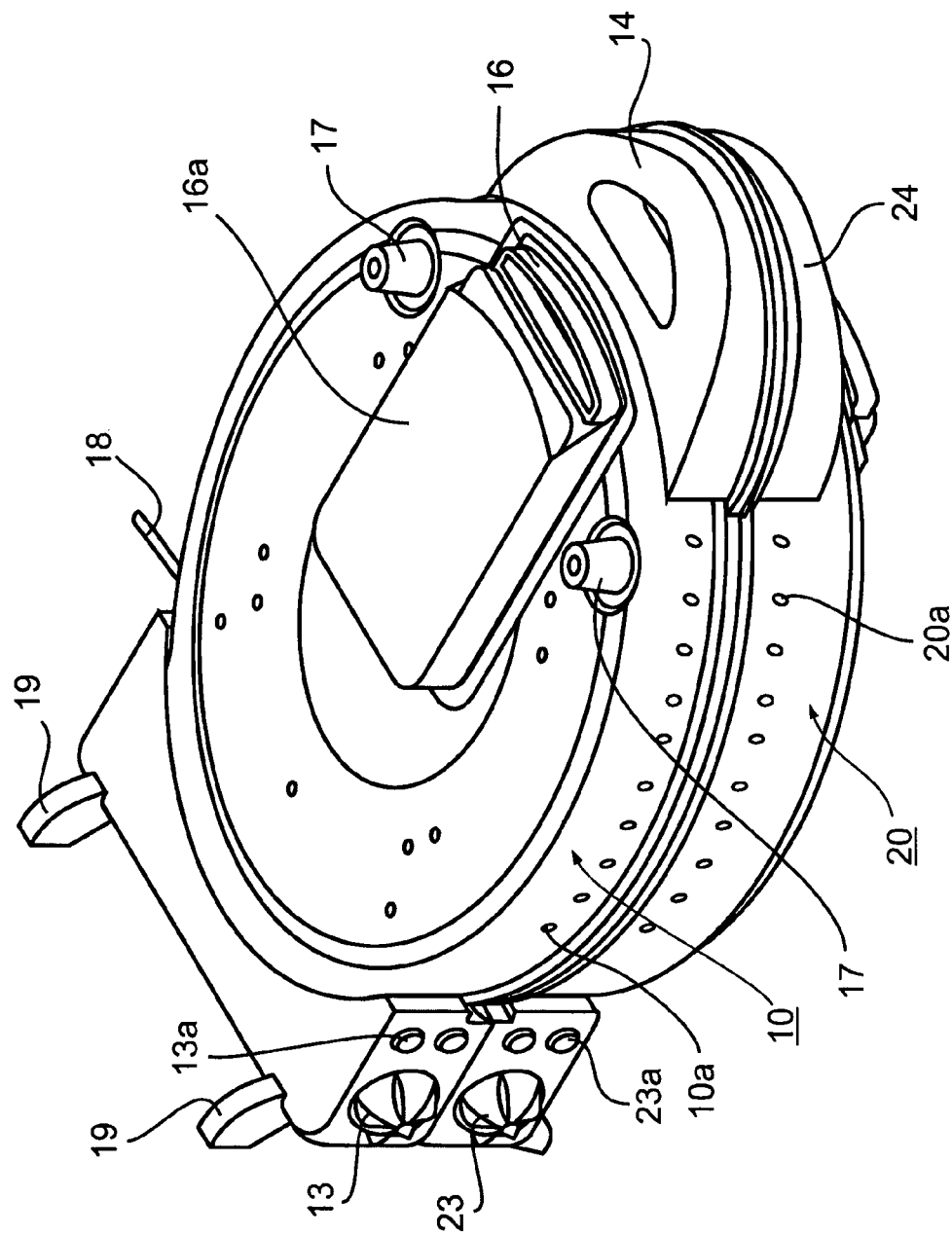
FIG. 2 is a bottom perspective view of the appliance at FIG. 1.
Figure 3:
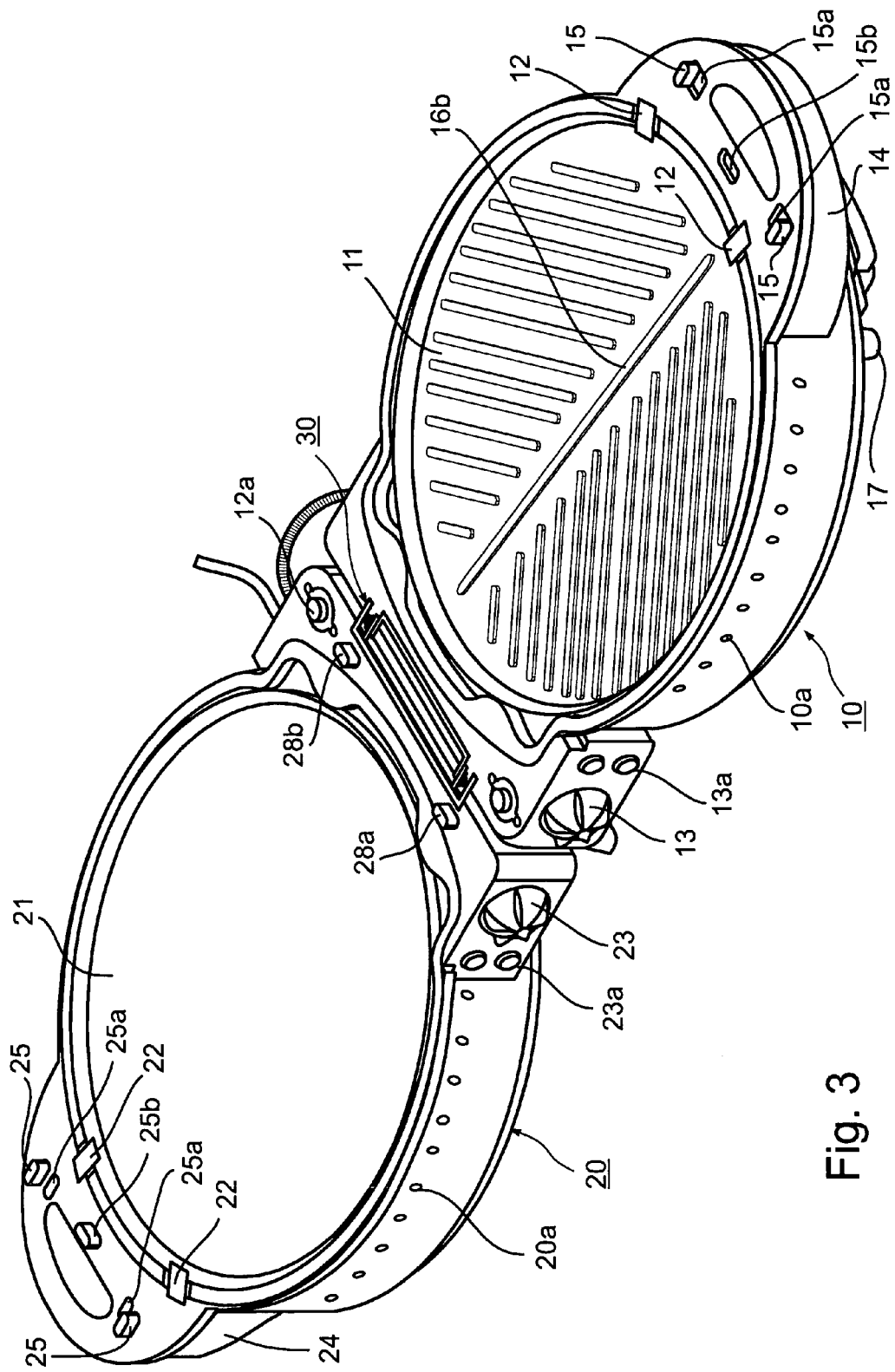
FIG. 3 is a perspective view of the appliance at FIG. 1 in its open condition.
Figure 6:
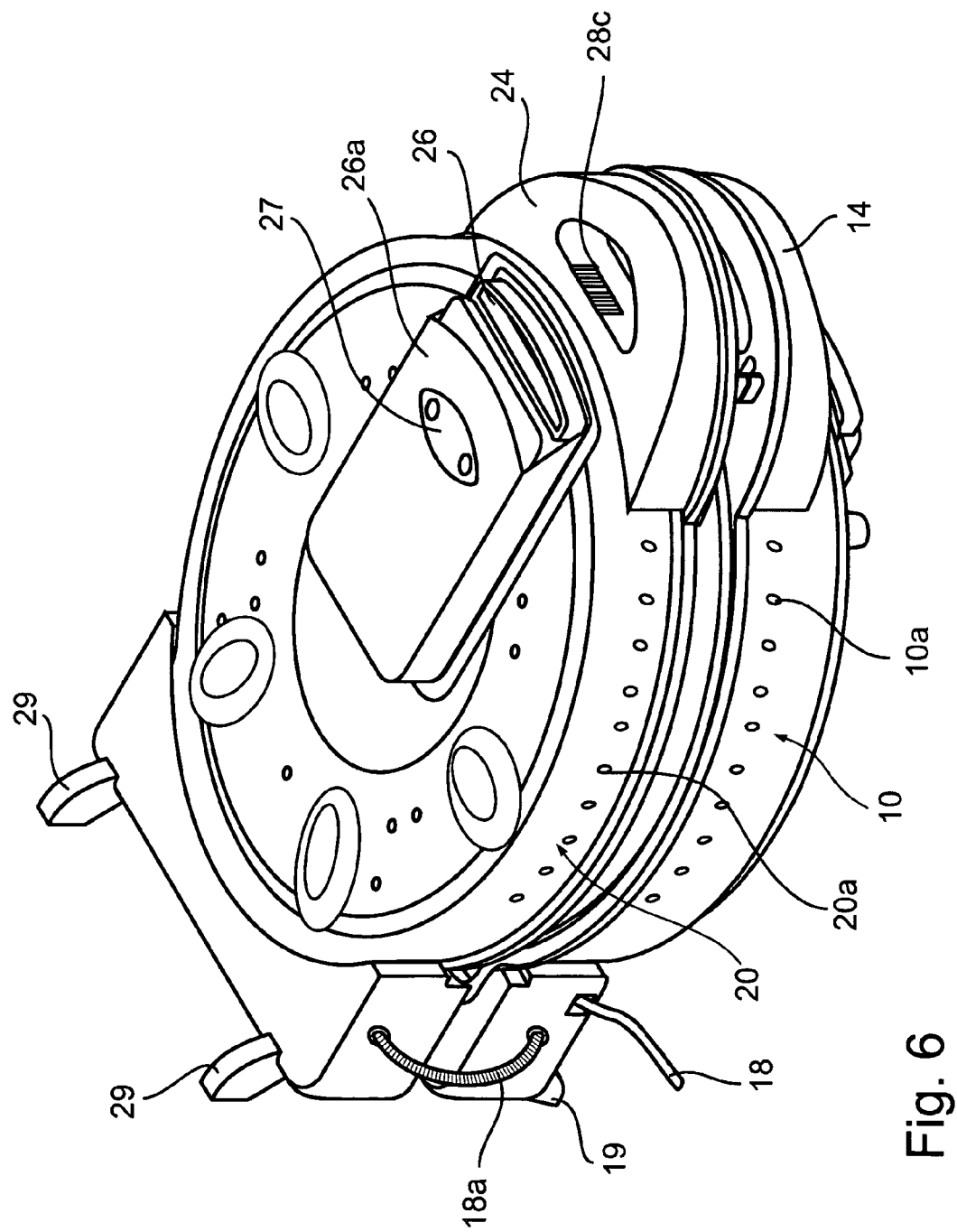
FIG. 6 is a top perspective view illustrating the appliance of FIG. 1 in the spaced condition of its cooking plates for cooking pizzas or other such food articles involving direct contact of only one surface of the food article with a hot surface of the cooking appliance.

The cooking appliance illustrated in the drawings includes two cooking plates, generally designated 10 and 20, respectively, pivotally mounted to each other by a hinge assembly, generally designated 30 (FIG. 3) from an open position, as illustrated in FIG. 3, for permitting introduction and removal of food articles to be cooked, to a closed position, as illustrated in FIGS. 1, 2 and 6, for cooking the food article. Hinge assembly 30 is a slideable hinge of a known construction which permits the two cooking plates 10, 20, not only to be pivoted to an open position shown in FIG. 3, or slid to a selected closed position. The two possible closed positions permit the two cooking plates to be in either a close parallel relationship as shown in FIGS. 1 and 2, or to be spaced a distance from each other and maintain a parallel relationship, as shown in FIG. 6. For example, when the appliance is used for grilling steaks or hamburgers, preparing waffles, or the like, where the opposite surfaces of the food article are to be in direct contact with the heated surface of the cooking appliance, the cooking appliance would be in the condition as illustrated in FIGS. 1 and 2, whereas when the cooking appliance is to be used for preparing pizzas, warming buns, or in other such applications where only one surface of the food article is to be in direct contact with a hot surface of the appliance, the appliance would be in the condition illustrated in FIG. 6.

Each of the two cooking plates 10, 20 includes a hot plate 11, 21, respectively, overlying an electrical heating element (not shown). Each hot plate 11, 12, is removably retained in its respective cooking plate over its heating element by clips 12, 22, respectively, engageable with the outer edges of the hot plates.

Various types of hot plates could be provided and selectively applied to the respective cooking plates according to the particular food to be cooked. For example, FIG. 3 illustrates hot plate 11 as a ribbed plate, and hot plate 21 as a smooth-surfaced plate. Such an arrangement would be particularly useful, for example, in preparing pizzas, where ribbed plate 11 is brought into direct contact with the pasta part of pizza, whereas smooth plate 21 is spaced away from the outer surface of the pizza containing the cheese, tomato, and other ingredients of the respective pizza being prepared.

Each cooking plate 10, 20, further includes a depressible button 12a, 22a, which is to be depressed in order to permit removing the respective hot plate 11, 21. Any suitable arrangement may be used for securely locking the respective hot plate in position during a cooking operation, such as to be releasable by depressing the respective button 12a, 22a, in order to permit the removal of the hot plate and replace it with another.

Each of the cooking plates 10, 20, includes a separate control knob 13, 23, respectively, for controlling its respective electrical heater. Control knobs 13, 23 may provide both on/off control, as well as selected-temperature control for the respective electrical heater element. Indicator lights 13a, 23a, are provided adjacent to each control knob 13, 23, to indicate the on/off condition, as well as the selected-temperature condition, of the respective electrical heater element.

As further seen in FIG. 3, the end of each cooking plate 10, 20, opposite to that connected to the slideable hinge 30, is provided with a handle 14, 24, respectively, to facilitate in transporting the cooking appliance in its closed condition.

As described earlier, an important feature of the cooking appliance illustrated in the drawings is that it is provided with an arrangement for firmly holding the two cooking plates 10, 20 in parallel-spaced relationship when used for preparing pizzas or the like. Thus, as seen in FIG. 3, handle 14 carried by cooking plate 10 is provided with a pair of stops 15 movable within slots 15a from an outer position in their respective slots (as shown in FIG. 3), to an inner position in their respective slots. Stops 15 cooperate with fixed stops 25 carried by handle 24 of cooking plate 20 to selectively support the two cooking plates either in the closely-spaced condition of FIGS. 1 and 2, e.g., for grilling steaks, or in the more distantly-spaced condition illustrated in FIG. 6, e.g. for preparing pizzas or the like. Thus, fixed stops 25 are fixed in position with respect to the pre-settable stops 15, such that when the pre-settable stops are moved to their outer positions within their respective slots 15a, they are aligned with the fixed stops 25 to thereby space the two plates more distantly apart, whereas when the pre-settable stops are moved to their inner positions within their respective slots 15a, they are non-aligned with fixed stops 25, and thereby permit the two cooking plates to be more closely spaced to each other.

It will thus be seen that the foregoing arrangement for maintaining the two cooking plates in their more distantly-spaced parallel relationship, e.g., for cooking pizzas or the like, support the two cooking plates from both ends, and thereby produces a more positive, reliable and long-lasting, supporting arrangement than the cantilever arrangement in the above-cited U.S. Pat. No. 6,192,788.

Handle 24 further includes two slots 25a inwardly of stops at 25 for receiving stops 15 of handle 14 when pre-set to their inner positions in their respective slots 15a. Handle 24 further includes a central projection 25b aligned with a central slot 15b and handle 14 so as to be received therein in the fully-closed condition of the two cooking plates 20, 10.

Both cooking plates 10, 20 carry on their outer surfaces removable trays, as shown 16 and 26, respectively, communicating with the interior of the cooking appliance for receiving drippings accumulated within the cooking appliance during a cooking operation. The two cooking plates further include holders, as shown at 16a and 17a, respectively, open at the side facing the respective handle 14, 24, to facilitate the introduction and removal of the respective trays 16, 26. Each of the cooking plates includes one or more openings, schematically shown by broken-line 16b in FIG. 3, to establish communication to their respecting trays 16 and 26.

The illustrated cooking appliance is supportable on a flat horizontal surface, such as a table or a kitchen counter, with cooking plate 10 underlying cooking plate 20, as shown in FIG. 1. For this purpose, cooking plate 10 is provided with a pair of feet 17 (FIG. 2) straddling the upper hand of tray holder 16a; whereas cooking plate 20 is provided with a single foot 27 (FIG. 1) at the center of its tray holder 26a.

The illustrated cooking appliance is normally openable to a partially-opened condition, wherein cooking plate 10 extends horizontally and cooking plate 20 extends vertically with respect to cooking plate 10. This facilitates the introduction into the appliance of food articles to be cooked, or the removal of such cooked food articles after cooking. When it is desired to fully open the cooking appliance, it is necessary to depress two push-buttons 28a, 28b carried by cooking plate 20, which thereby permits cooking plate 20 to be open to the fully-open position illustrated in FIG. 3.

As further shown in FIG. 1, cooking plate 20 further includes a push-button 28c on its outer edge, adjacent to its handle 24, which is to be depressed in order to open the cooking appliance from the position illustrated in FIG. 1, to its partially-opened condition (not illustrated), wherein cooking plate 20 extends vertically with respect to horizontally-extended cooking plate 10, or to its fully opened position, as illustrated in FIG. 3.

Electrical power is supplied to the cooking appliance via a conductor 18 (FIG. 1) leading into cooking plate 10, and another conductor 18a leading into cooking plate 20. The latter conductor 18a is preferably enclosed within a spiral-type conduit as shown in FIG. 1 to accommodate the pivotal movement of cooking plate 20 with respect to cooking plate 10.

Figure 4:
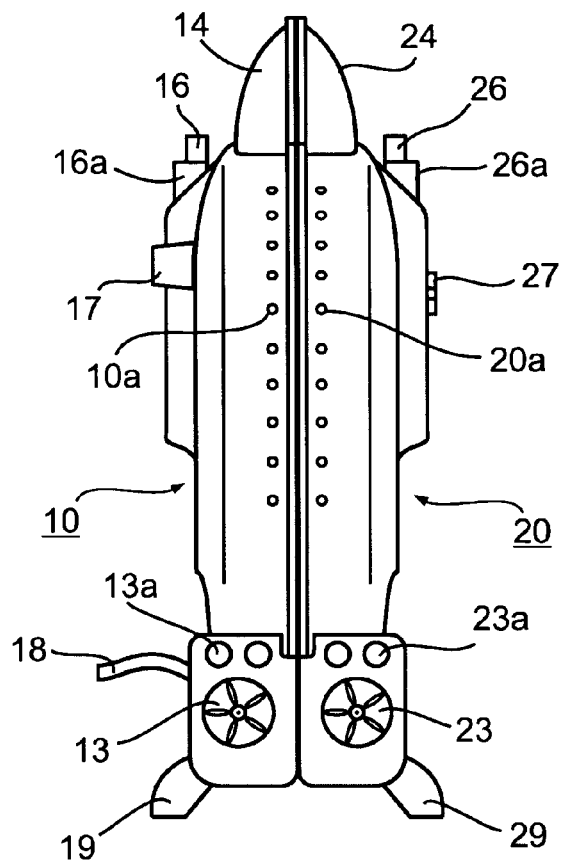
FIG. 4 is a side view of the appliance of FIG. 1 in its closed condition for storage.
Figure 5:
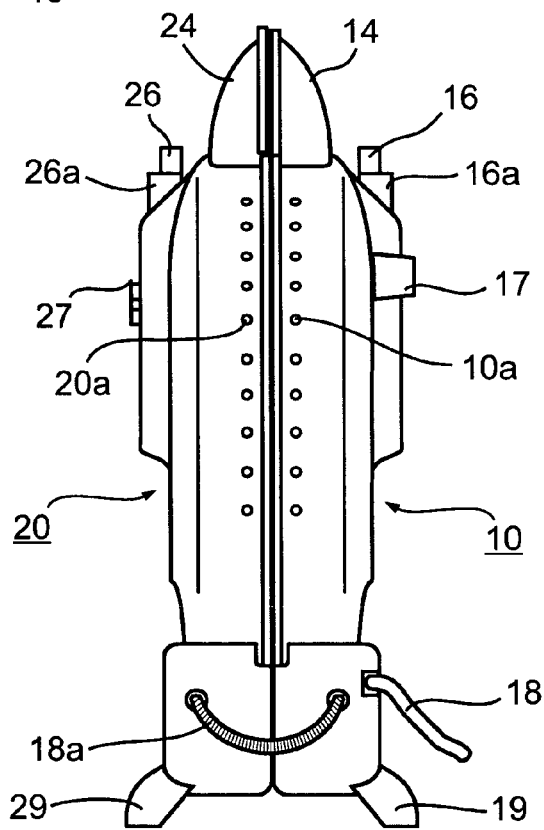
FIG. 5 is a side view of the appliance of FIG. 1 from the opposite side.

As further shown in FIG. 1, the end of the two cooking plates 10, 20 opposite to their ends carrying their respective handles 14, 24 are provided with legs 19, 29, respectively, for supporting the cooking appliance vertically in its fully-closed condition as illustrated in FIGS. 4 and 5 for convenient storage.

The outer periphery of the two cooking plates 10, 20, are provided with ventilation openings, as shown at 10a, 20a, to ventilate the interior of the cooking appliance to the atmosphere during a cooking operation.

The manner of using the illustrated cooking appliance will be apparent from the drawings and the above description.

Thus, normally the cooking appliance is in its fully-closed condition and supported vertically, as shown in FIGS. 4 and 5, for convenient storage when not in use.

When it is to be used, the cooking appliance is placed on a flat horizontal surface, such as a table or counter-top, with its cooking plate 20 overlying cooking plate 10, as illustrated in FIG. 1. Push-button 28c is then depressed to enable pivoting cooking plate 20 to its partially-opened position wherein cooking plate 20 extends vertically with respect to horizontally-extended cooking plate 10. This permits the convenient introduction of food articles to be cooked into the appliance. If desired, push-button 28a, 28b (FIG. 3), carried by cooking plate 20 may be depressed to permit fully opening the appliance to the position illustrated in FIG. 3.

Figure 7:
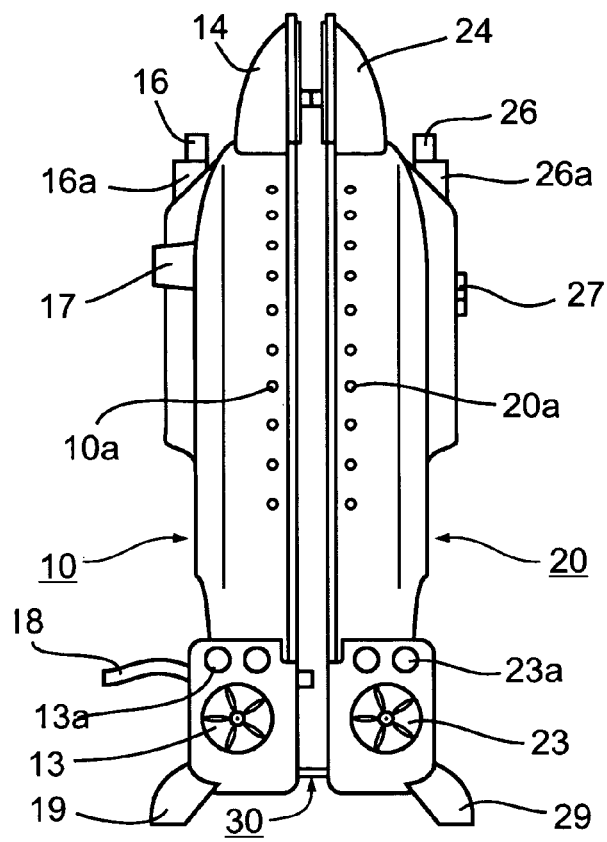
FIGS. 7 and 8 are views, corresponding to those of FIGS. 4 and 5, but illustrating the two cooking plates in the spaced condition of FIG. 6.
Figure 8:
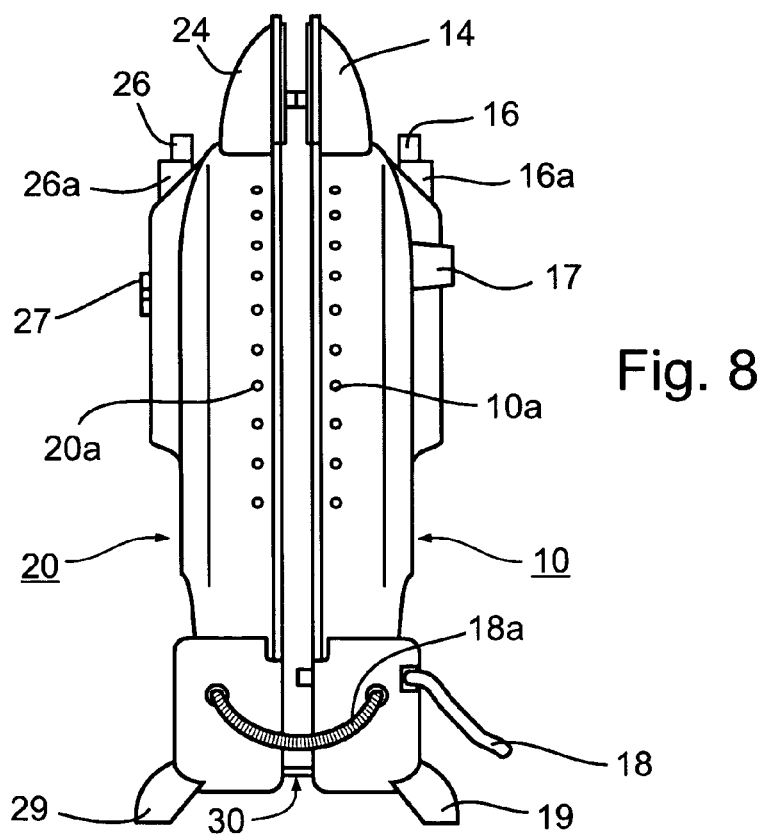

If the article to be cooked is a pizza, gratinated dish, or other item in which only one surface is to be brought into direct contact with a hot plate cooking plate 20 would be pivoted to its spaced closed position, as illustrated in FIGS. 6, 7 and 8, wherein cooking plate 20 is parallel to, but spaced from, cooking plate 10 and from the food article on the latter cooking plate. It will thus be seen that in this spaced cooking position, hot plate 21 of the appliance is spaced from the upper surface of the article being cooked. As described earlier, to position cooking plate 20 in this spaced position, the two pre-settable stops 15 would have been first preset to their outer positions within their respective slots 15a, as shown in FIG. 3, so as to be aligned with fixed stop 25 carried by cooking plate 20. When stops 15 are so preset, the two cooking plates 10, 20 are spaced from each other by the heights of the two stops 15 and 25.

Sliding hinge 30 at the opposite end of the two cooking plates permits this spaced cooking position of the two plates. It also cooperates, with the stops 15 and 25 at the opposite ends of their respective cooking plates for firmly supporting the two cooking plates in this spaced condition.

Control knobs 13 and 23 of the two cooking plates may then be manipulated to energize the heater elements within the two cooking plates, and also to control the temperature produced by the heater elements.

When it is desired to use the illustrated appliance for cooking steaks, hamburgers, waffles, or the like, the two movable stops 15 carried by cooking plate 10 are moved to their inner positions within their respective slots 15a, so as to be out of alignment with the fixed stops 25 carried by cooking plate 20, but rather to be in alignment with the slots 25a inwardly of the fixed stops 25. Accordingly, cooking plate 20 then may be pivoted to its fully-closed condition, as illustrated in FIGS. 1 and 2, this being permitted by the entry of stops 15a of cooking plate 10 into slots 25a of cooking plate 20, and the entry of pin 25b of cooking plate 20 into slot 15b of cooking plate 10.

If the food article produces any drippings during the cooking operation, such drippings are received in the respective tray 16 carried by cooking plate 10, which tray may be periodically removed for cleaning purposes. Cooking plate 20 is similarly provided with a tray 16 in case the appliance is used with cooking plate 20 occupying the lower position.

While the invention has been described with respect to one preferred embodiment, it will be appreciated that this is set forth nearly for purposes of example, and that many other variations, modifications and applications of the invention may be made.

What is claimed is:

1. A cooking appliance comprising:
    a pair of cooking plates pivotally mounted from an open position for permitting introduction and removal of food articles, to a closed position defining an interior for receiving and cooking the food articles;
    said pair of cooking plates being pivotally mounted about a pair of spaced, parallel pivotal axes by a slideable hinge at one end of said cooking plates permitting their pivotal axes to be slid towards or away from each other;
    said pair of cooking plates including pre-settable stops at their opposite ends pre-settable to a first position permitting two-surface contact with the opposite sides of a food article, or a second position supporting one cooking plate and the food article in spaced parallel relationship with respect to the other cooking plate to permit single-surface contact with only one side of the food article.

2. The cooking appliance according to claim 1, wherein said pre-settable stops are located on the outer edge of one of said cooking plates in the end thereof opposite to that of said slideable hinge, said pre-settable stops being pre-settable to engage or disengage fixed surfaces on the other of said cooking plates on the end thereof opposite to that of said slideable hinge.

3. The cooking appliance according to claim 2, wherein said fixed surfaces on said other cooking plate are fixed on the outer edges thereof, and said pre-settable stops on said one cooking plate are movable to a first position non-aligned with said fixed stops, or to a second position aligned with said fixed stops.

4. The cooking appliance according to claim 2, wherein the ends of both cooking plates opposite to that of said slideable hinge are provided with handles for carrying the cooking appliance in its closed conditions.

5. The cooking appliance according to claim 1, wherein said one end of the pair of cooking plates including said slideable hinge is also provided with feet permitting the cooking appliance to be stably supported on a flat horizontal surface in a closed vertical position for convenient storage when not in use.

6. The cooking appliance according to claim 5, wherein each of said cooking plates includes a foot on its outer surface engageable with the flat horizontal surface for stably supporting the cooking appliance in an open condition, when the pair of cooking plates are pivoted to extend substantially in alignment with each other, to permit convenient introduction or removal of the food articles.

7. The cooking appliance according to claim 1, wherein at least one of said cooking plates carries on its outer surface a removable tray communicating with the interior of the cooking appliance for receiving drippings accumulating within the cooking appliance during a cooking operation.

8. The cooking appliance according to claim 7, wherein said at least one cooking plate carries on its outer surface a holder open at one side to permit the slideable introduction and removal of the tray.

9. The cooking appliance according to claim 7, wherein both of said cooking plates carry on their outer surfaces a removable tray, communicating with the interior of the cooking appliance for receiving drippings accumulating within the cooking appliance during a cooking operation.

10. The cooking appliance according to claim 1, wherein the outer peripheries of said pair of cooking plates are formed with ventilating openings ventilating the interior of said cooking appliance to the atmosphere during a cooking operation.

11. A cooking appliance comprising:
a pair of cooking plates pivotally mounted to each other from an open position for permitting introduction and removal of food articles, to a closed position defining an interior for receiving and cooking the food articles;
said pair of cooking plates being pivotally mounted to each other about a pair of spaced, parallel pivotal axes by a slideable hinge at one end of said cooking plates permitting their pivotal axes to be slid towards or away from each other;
at least one of the cooking plates carrying on its outer surface a removable tray communicating with the interior of the cooking appliance for receiving drippings accumulating within the cooking appliance during a cooking operation.

12. The cooking appliance according to claim 11, wherein said at least one cooking plate carries on its outer surface a holder open at one side to permit the slideable introduction and removal of the tray.

13. The cooking appliance according to claim 11, wherein both of said cooking plates carry on their outer surfaces a removable tray, communicating with the interior of the cooking appliance for receiving drippings accumulating within the cooking appliance during a cooking operation.

14. The cooking appliance according to claim 11, wherein the outer peripheries of said pair of cooking plates are formed with ventilating openings ventilating the interior of said cooking appliance to the atmosphere during a cooking operation.

15. The cooking appliance according to claim 11, wherein said pair of cooking plates include pre-settable stops at their opposite ends pre-settable to a first position permitting two-surface contact with the food article, or a second position supporting one cooking plate in spaced parallel relationship with respect to the other cooking plate to permit singe-surface contact with the food articles.

16. The cooking appliance according to claim 15, wherein said pre-settable stops are located on the outer edge of one of said cooking plates in the end thereof opposite to that of said slideable hinge, said pre-settable stops being pre-settable to engage or disengage fixed surfaces on the other of said cooking plates on the end thereof opposite to that of said slideable hinge.

17. The cooking appliance according to claim 16, wherein said fixed surfaces on said other cooking plate are fixed on the outer edges thereof, and said pre-settable stops on said one cooking plate are movable to a first position non-aligned with said fixed stops, or to a second position aligned with said fixed stops.

18. The cooking appliance according to claim 16, wherein said opposite ends of said cooking plates provided with said pre-settable stops, are also provided with a handle for carrying the cooking appliance in its closed condition.

19. The cooking appliance according to claim 15, wherein said one end of the pair of cooking plates including said slideable hinge is also provided with feet permitting the cooking appliance to be stably supported on a flat horizontal surface in a closed vertical position for convenient storage when not in use.

20. The cooking appliance according to claim 19, wherein each of said cooking plates includes a foot on its outer surface engageable with the flat horizontal surface for stably supporting the cooking appliance in an open condition, when the pair of cooking plates are pivoted to extend substantially parallel to each other, to permit convenient introduction or removal of the food articles.

* * * * *